US012560471B2

(12) United States Patent
Christopher et al.

(10) Patent No.: US 12,560,471 B2
(45) Date of Patent: Feb. 24, 2026

(54) SYSTEM AND METHOD FOR LIQUID LEVEL DETECTION

(71) Applicant: Wavesense, Inc., Irvine, CA (US)

(72) Inventors: Kevin Christopher, Laguna Hills, CA (US); Ron Bergold, Laguna Woods, CA (US); Paul J. Gleason, Laguna Niguel, CA (US); Andrew J. Boyce, Laguna Woods, CA (US); James Foster, Orange, CA (US); Bradley J. Sargent, Mission Viejo, CA (US); Nafiseh Jafari, Glendale, CA (US)

(73) Assignee: WAVESENSE, INC., Irvine, CA (US)

( * ) Notice: Subject to any disclaimer, the term of this patent is extended or adjusted under 35 U.S.C. 154(b) by 100 days.

(21) Appl. No.: 18/591,267

(22) Filed: Feb. 29, 2024

(65) Prior Publication Data

US 2025/0251271 A1     Aug. 7, 2025

Related U.S. Application Data

(63) Continuation-in-part of application No. 29/927,201, filed on Feb. 2, 2024, and a continuation-in-part of application No. 29/927,195, filed on Feb. 2, 2024.

(51) Int. Cl.
G01F 23/292 (2006.01)

(52) U.S. Cl.
CPC ................................. G01F 23/2921 (2013.01)

(58) Field of Classification Search
CPC ..... G01F 23/2921; G01F 22/00; G01F 23/292
See application file for complete search history.

(56) References Cited

U.S. PATENT DOCUMENTS

| | | | | |
|---|---|---|---|---|
| 8,037,659 | B2* | 10/2011 | Osborne | ............... A61J 1/2096 |
| | | | | 53/53 |
| 10,329,554 | B2 | 6/2019 | Feistel | |
| 10,585,101 | B2 | 3/2020 | Feistel | |
| D886,320 | S | 6/2020 | Bruemmer | |
| D890,362 | S | 7/2020 | Bruemmer | |
| 10,927,366 | B2 | 2/2021 | Feistel | |

* cited by examiner

*Primary Examiner* — Tony Ko
(74) *Attorney, Agent, or Firm* — STETINA GARRED BRUCKER & NEWBOLES

(57) ABSTRACT

Systems and methods are disclosed for measuring the volume of liquid contained in a vessel. A sensor array comprising a plurality of sensors and a laser apparatus comprising one or more lasers can be positioned relative to each other such that lasers beams emitted from the laser(s) can be received by the sensor array. The vessel can be positioned such that each laser beam intersects the vessel at a certain predetermined height. A liquid level's height may be determined by the volume of liquid in the vessel. A refraction of a laser beam may be influenced by the presence or absence of liquid at that predetermined height, which could be the result of the liquid level's height being above or below that predetermined height. Readings from the sensor array may determine where refraction occurs, allowing ranges or values of the volume of liquid in the vessel to be extrapolated.

17 Claims, 4 Drawing Sheets

SYSTEM AND METHOD FOR LIQUID LEVEL DETECTION

CROSS-REFERENCE TO RELATED APPLICATIONS

This application is a continuation in part to U.S. Design Application Ser. No. 29/927,195, filed on Feb. 2, 2024, entitled VESSEL DESIGN and U.S. Design Application Ser. No. 29/927,201, filed on Feb. 2, 2024, entitled CUVETTE DESIGN, the entire disclosure of which is hereby wholly incorporated by reference.

STATEMENT RE: FEDERALLY SPONSORED RESEARCH/DEVELOPMENT

Not Applicable

BACKGROUND

1. Field of Invention

The present application relates to the measurement of the volume of liquid contained in a vessel. More specifically, the present application relates to the transmission of laser beams through a vessel at predetermined heights thereof and observing the refraction of those laser beams to find the height of a liquid level and thereafter the corresponding volume of liquid contained in the vessel.

2. Related Art

Various fields rely upon the measurement of liquids in containers, particularly in fields involving analyte extraction/identification. Liquid biopsies are an example illustrating this need, as it could be essential to measure a liquid sample from an individual to determine how much and how many reagents to add to that sample to properly diagnose health conditions of that individual. Various methods, systems and articles related to assays, biopsies, and more are disclosed in U.S. Pat. No. 10,585,101 entitled "Prostatic Liquid Biopsy for the Detection of Prostate Cancer and Benign Prostatic Hyperplasia", U.S. Pat. No. 10,329,554 entitled "System and Method for Sequestering Substances in Bulk Liquids", U.S. Pat. No. 10,927,366 entitled "System and Method for Sequestering Substances in Bulk Liquids", U.S. Design Pat. No. D886,320 entitled "Fluid sequestration apparatus", U.S. Design Pat. No. D890,362 entitled "Annular Magnet Housing", U.S. Design patent application No. 29/927,195 entitled "Vessel Design", and U.S. Design patent application No. 29/927,201 entitled "Cuvette Design", in which the disclosures of each are incorporated herein by reference in their entirety.

Notwithstanding the need for such liquid measurement systems and methods, current measurement systems and methods in the art often fall short of efficiently and reliably measuring liquid volumes in these applications. In particular, automated systems for processing fluid samples are exceptionally challenging to implement in light of these shortcomings. It can be seen that a need exists in the art for systems and methods for reliably and efficiently measuring the volume of liquid in a vessel, which may give way for the automation of procedures like biopsies.

BRIEF SUMMARY

To solve these and other problems, systems and methods are disclosed for measuring the volume of liquid contained in a vessel. A sensor array having a plurality of sensors and a laser apparatus with one or more lasers operative to emit laser beams can be provided. The sensor array and laser apparatus can be positioned such that the sensor array receives the emitted laser beam(s), while leaving space between the two devices such that a vessel containing a volume of liquid can be positioned. When the vessel is properly positioned, the laser beams may correspond to a predetermined height of the vessel, whereby the laser beam could intersect the vessel at that height. Depending on the absence or presence of a liquid at the predetermined height, which may be the result of the volume of fluid contained in the vessel dictating a liquid level and whether its height is below or above that predetermined height, the laser beam may refract. The refraction that occurs may be derived by the sensor array's readings, particularly which sensors are receiving the laser beam and at what intensity. By correlating the predetermined height of one or more laser beams with the vessel's internal volume and/or by raising/lowing the laser, ranges or precise values for the volume of liquid contained in a vessel can be found.

A method of measuring the volume of liquid in a vessel may comprise the steps of providing a system comprising a sensor array and a laser apparatus, positioning the vessel relative to the sensor array and the laser apparatus, and emitting a laser beam corresponding to a predetermined height from a laser. Said positioning may set a location and an orientation of the vessel, and this orientation may be key in defining a height of a liquid level and the heights at which laser beams intersect the vessel. A first sensor could be designated as a sensor which receives the laser beam when the vessel is absent, a second sensor could be designated as a sensor which receives the laser beam when the vessel is present but liquid is absent at the predetermined height, and a third sensor could be designed as a sensor which receives the laser beam when the vessel is present and so too is liquid at the predetermined height. In the event that the liquid absorbs at least some of the laser beam, the reduction or absence of a reading on the sensor array could indicate the presence of liquid at that predetermined height, as opposed to the third sensor receiving the laser beam.

A second laser can be present in a laser apparatus which can emit a second laser beam corresponding to a second predetermined height. A fourth, fifth, and sixth sensor can receive the second laser beam when the vessel is absent, when the vessel is present but liquid is absent at the second predetermined height, and when the vessel is present and so too is the liquid at the second predetermined height respectively.

Light pipes may be positioned relative to the laser apparatus and the sensor array such that laser beam transmits through the light pipe prior to being received by the sensor array. As understood by those skilled in the art, light pipes can receive light to change its angle of travel and/or make it more uniform, and utilizing them in the systems and methods disclosed herein may ensure that the proper sensor receives the refracted light.

Any lasers of the laser apparatus may be movable relative to the location of the vessel when properly positioned. This may allow a laser to be raised or lowered, thus changing the height at which an emitted laser beam may intersect a vessel. If, during a liquid measurement operation, it is determined the laser beam is above a liquid level, the laser may be lowered until a different outcome is achieved. If, alternatively, the readings of a sensor array find that the laser beam is below the liquid level, the laser may be raised until a different outcome is reached. The displacement of the laser can be used in conjunction with the laser's original predetermined height to find a precise value for the height of the liquid level, and thereafter the volume of liquid contained in the vessel. A vessel's positioning may define a centerline, such as a line of symmetry or a bisecting line, and a laser beam, when first emitted from a laser, may be parallel and/or off-center to this centerline, which may allow for sufficiently measurable refraction outcomes to occur. The movability of a laser may allow a laser's relationship with a centerline to change.

Liquid volume measurement can be used in conjunction with another process such as the identification of a target analyte believed to be present in the liquid (such as a biopsy), which may require a precise amount of certain reagents to be added to the liquid based on the previously measured volume. Such reagents can include a buffer, a conditioner, a chemical agent, a paramagnetic particle, a preservative, a catalyst, a detection moiety, or combinations thereof. A system, in addition to having liquid volume measurement capabilities, may be able to carry out steps in a biopsy, such as adding the precise amount of reagents to the vessel (wherein such reagents may be provided in one or more reservoirs of the system), circulating the mixture therein, and sequestering the target analyte. In the event that the volume of liquid is low, a reagent, like a buffer, can be added to the vessel until a measurable volume is reached, such as that which a laser beam's predetermined height corresponds to. The amount of reagent added to the vessel to reach such a point may be subtracted from this volume to find the original volume of liquid in the vessel, after which the remaining reagents required may be added.

All of these embodiments are contemplated to be within the scope of this disclosure. These and other embodiments will become readily apparent to those skilled in the art form the following detailed description of the preferred embodiments having reference to the attached figures, the disclosure not being limited to any particular preferred embodiment.

BRIEF DESCRIPTION OF THE DRAWINGS

These and other features and advantages of the various embodiments disclosed herein will be better understood with respect to the following description and drawings, in which like numbers refer to like parts throughout, and in which.

Common reference numerals are used throughout the drawings and the detailed description to indicate the same elements.

DETAILED DESCRIPTION

Disclosed herein are various methods and systems for determining the volume of liquid contained in a vessel. A sensor array having a plurality of sensors and a laser apparatus having one or more lasers may be positioned relative to each other such that one or more laser beams emitted from the laser(s) may be received by a first sensor.

The vessel containing the liquid may be positioned relative to the sensor array and laser apparatus such that an emitted laser beam could intersect the vessel at a predetermined height of the vessel. Transmitting through the vessel may cause a refraction of the laser beam before it is received by the sensor array. The refraction that occurs may depend on the relationship between the predetermined height and a height of a liquid level corresponding to the volume of liquid contained in the vessel and an orientation of that vessel. If the liquid level's height is below the predetermined height at which the laser beam intersects the vessel, the refraction arising from the laser beam intersecting the walls of the vessel may cause a second sensor to receive the laser beam. If the liquid level's height is above that predetermined height, the refraction arising from the laser beam intersecting the walls of the vessel and the liquid contained in the vessel may cause a third sensor to receive the laser beam; depending on the liquid's composition and the properties of the laser beam emitted, the liquid may alternatively absorb the laser beam, thus reducing how much of the laser beam could otherwise be received by the sensor array. By comparing sensor readings corresponding to certain laser beams set to different predetermined heights and/or measuring the displacement of lasers relative to their original predetermined heights which lead to a change in sensor readings, one can determine ranges or precise values for the volume of liquid contained in the vessel. Finding this volume may be beneficial when, for example, the liquid is a sample from an individual and the volume of that particular sample dictates the amount of reagents that are to be added to that sample as part of a biopsy.

This description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
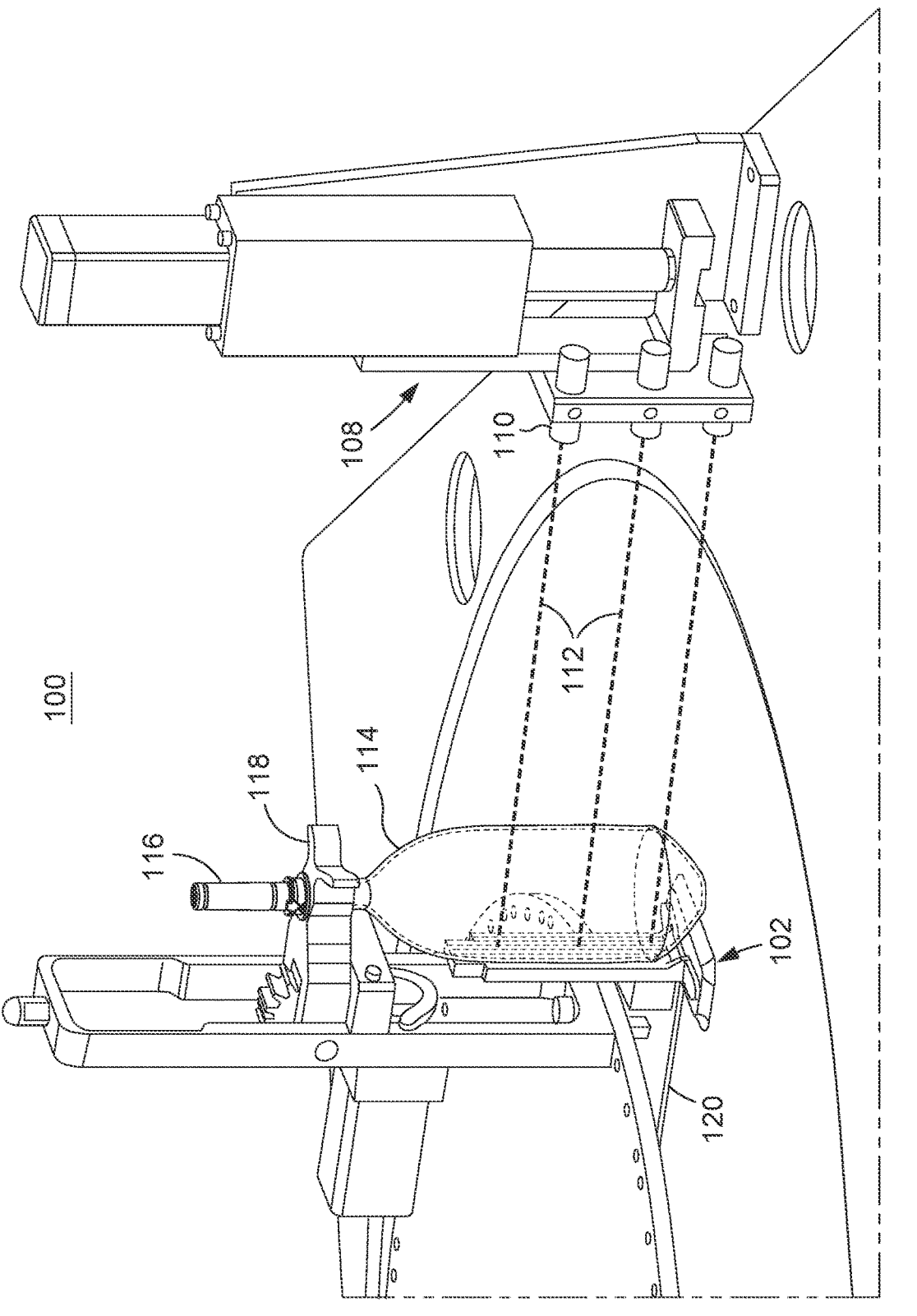
FIG. 1 is an exemplary system of this present disclosure and an operation thereof.

Referring to FIG. 1, an exemplary system of this present disclosure and an operation thereof is shown. This system 100 may comprise features for measuring the volume of liquid in a vessel 114, such as a sensor array 102 and a laser apparatus 108. Such a system 100 could further comprise additional features for other purposes, like performing a biopsy on a liquid sample contained in the vessel 114, as will be elaborated upon later in this disclosure. Whichever combination of features are present therein, a system 100 can be operated manually, can be capable of automatic operation, or a combination of both. Automatic operations could take the form of, for instance, rotary index machines for positioning the vessel 114, timed/pulsed operation of the lasers 110, programing a processor 120 to respond to particular readings obtained by the sensor array 102, and more.

The laser apparatus 108 may have one or more lasers 110, each of which could be operative to emit a laser beam 112; preferably, each laser 110 would be operative to emit just one laser beam 112, but lasers 110 which emit multiple laser beams 112 pointing in different directions may also be employed in a system 100. Laser beam or beams 112 of one or more particular lasers 110 could be constantly emitted throughout the process of measuring liquid contained in a vessel 114 or only emitted during certain periods of that process. For instance, individual lasers 110 of a laser apparatus 108 could emit their respective laser beams 112 one at a time after a vessel 114 is positioned for the purpose of finding a range at which the height of a liquid level may be, after which just one of those lasers 110 may be emitted to find the precise volume of liquid in the vessel 114.

A sensor array 102 having a plurality of sensors 104 (shown in FIGS. 2A-2C) may be positioned relative to the laser apparatus 108 such that when a laser 110 emits a laser beam 112, the sensor array 102 could receive the laser beam 112. A proper positioning of the sensor array 102 and laser apparatus 108 may also ensure that a vessel 114 can be placed in its proper position for liquid volume measurement (via there being enough space between the laser apparatus 108 and the sensor array 102 for the vessel 114 to occupy), the laser(s) 110 align to their designated predetermined height(s) of the vessel 114, and/or certain sensors 104 of the sensor array 102 are emplaced to receive the laser beams 112 for particular refraction outcomes. This positioning of the sensor array 102 and the laser apparatus 108 may be a result of both features being placed in fixed positions in the system 100 (e.g., being bolted into place), or such positioning may be a result of the sensor array 102 and/or the laser apparatus 108 being movable and being set to the proper position.

The sensors 104 could each individually be capable of receiving laser beams 112 emitted from the laser(s) 110. The sensor array 102 can comprise photo transistors and op-amp gain stages to allow for the detection of small changes in the received laser beam 112. Readings of the sensors 104 can be measured and/or recorded by a processor 120, which may determine which of those sensors 104 are receiving a laser beam 112 and the intensity of the readings for each of the sensors 104. To ensure that laser beams 112 are properly transmitted to the sensor array 102 and the proper sensor 104, one or more light pipes can be positioned in relation to the sensor array 102, preferably such that the light pipes receive the laser beam or beams 112 after having fully passed through the vessel 114 but prior to being received by the sensor array 102. As understood by those skilled in the art, light pipes, which typically are made of acrylic materials, can receive light to change its angle of travel and/or make it more uniform. In this respect, conventional and future developed light pipes can be used as the light pipes in this system 100. In the event that the refraction of a laser beam 112 results in a substantial change to the laser beam's 112 trajectory (which could occur when a laser beam 112 intersects a frustoconical portion of the vessel 114, for instance), light pipes may ensure that laser beams 112 transmitted therethrough are redirected towards the correct sensor 104. Light pipes could also help to make a sensor array 102 and/or the system 100 smaller and/or more manageable via allowing for a simpler sensor array 102 to be used, such as a one-dimensional sensor array as opposed to a two-dimensional sensor array. The operation of the laser(s) 110 along with measurements obtained from the sensors 104 can be used to determine if a vessel 114 is present and/or what volume of liquid such a vessel 114 could contain, as will be discussed in relation to FIGS. 2A-2C.

The vessel 114 containing a volume of liquid may be positioned relative to the sensor array 102 and the laser apparatus 108, which can include setting the vessel 114 in a proper location and/or setting a certain orientation of the vessel 114. The vessel 114 of this present disclosure may be that which was disclosed in Applicant's previously filed U.S. Design patent application No. 29/927,195 entitled "Vessel Design", the disclosure of which is incorporated herein by reference in its entirety. A cuvette 116 may be coupled with the vessel 114 on a top thereof where an opening may be defined. The cuvette 116 of this present disclosure may be that which was disclosed in Applicant's previously filed U.S. Design patent application No. 29/927,201 entitled "Cuvette Design", the disclosure of which is incorporated herein by reference in its entirety. The geometry of a vessel 114 can be measured (which may include the diameter of a vessel 114 at certain heights) to determine the proper positioning of that vessel 114. Measuring the geometry in this manner may occur prior to a system 100 receiving a vessel 114, or the system 100 itself may be capable of measuring the geometry of a vessel 114 after receiving the vessel 114 and finding the proper positioning of that vessel 114 to preform a precise liquid volume measurement. This could allow a system 100 to adapt to different received vessels 114 having different geometries. The system 100 may rely upon the lasers 110 and readings from the sensor array 102 to measure a geometry of a given vessel 114. Finding a geometry of a vessel 114 may help in determining a centerline defined by vessel from which a laser beam 112 could be offset from by a distance "a", as will be discussed later in this disclosure.

In order to properly determine the volume of liquid in the vessel 114, the system 100 may require that a precise location and orientation of the vessel 114, as even minor deviations from the intended position of a vessel 114 could have a significant effect on the refraction of the laser beam(s) 112 and thus, which sensors 104 receive those laser beam(s) 112. To help to avoid an incorrect positioning of the vessel 114, the system 100 may have a receiving structure 118, such as a clamp, to receive the vessel 114 and ensure a proper orientation thereof. The system 100 may further be operative to move this receiving structure 118 relative to the sensor array 102 and laser apparatus 108 into the proper location. The vessel 114 may be constructed so as to interact with the receiving structure 118 (i.e., define a recess where a portion of a clamp could fit into).

A vertical minimum, from which a height of the vessel 114 can be measured from, may be defined by the orientation of the vessel 114. Similarly, a liquid level may be a result of the orientation of the vessel 114, the amount of liquid contained in the vessel 114, and the geometry of the vessel 114. By correlating heights of the liquid levels with known volumes of liquid in a vessel 114 in a particular orientation, one could develop a model to determine an unknown volume of liquid in the same type of vessel 114 in the same orientation by measuring the height of its liquid level. One could find the relationship between a volume of liquid and the ensuing liquid level in a vessel 114 at a certain orientation through experimentation and/or by calculating the internal volume of a vessel 114 and how a liquid would fill the vessel 114 in that orientation. A processor 120 of a system may be programmed to receive liquid level height inputs and recognize corresponding volumes of liquid for a vessel 114 and/or programmed with the internal geometry of the vessel 114 so as to calculate how a height of a liquid level could correspond to a particular volume of liquid. Preferably, the vessel 114 would have an intended upright orientation with a simplistic geometry to make such calculations and correlations simpler.

From a chosen vessel 114 and desired orientation thereof, one may decide predetermined values of volume of liquid to measure. By relating these predetermined volumes to heights of the resulting liquid levels, predetermined heights can be found. Thereafter, the lasers 110 may be configured such that their dedicated laser beams 112 first intersect the vessel 114 at these predetermined heights. The vessel 114 may be at least partially made of a transparent material so as to promote transmission of the laser beam 112 therethrough. The refraction of these laser beams 112 could depend on the absence or presence of liquid at these predetermined heights, and by measuring the readings of sensors and relating those readings to a refraction of a laser beam 112, the presence or absence of liquid at that predetermined height can be deduced. From deductions of one or more laser beams 112, a range or value for the height of the liquid level and thus, volume of liquid in the vessel 114, can be found. The vessel 114 and the liquid to be measured may be tested before hand with a system 100 so as to anticipate which sensors 104 could receive the laser beam 112 for each anticipated refraction outcome. The processor 120 can then be programmed to recognize certain sensor array 102 measurements as indicating particular liquid volume ranges/values.

To set multiple lasers 110 of a laser apparatus 108 to different predetermined heights, lasers 110 may be spaced from each other vertically, horizontally, or both, and/or lasers 110 may be oriented such that their dedicated laser beams 112 are emitted at different angles from one another (e.g., one laser can be angled vertically upwards such that even if that laser is positioned vertically lower than another laser, its laser beam could intersect the vessel at a higher predetermined height). In an ideal embodiment, however, the lasers 110 would be spaced from each other vertically, share the same horizontal positioning, and have their respective laser beams 112 all be parallel to a horizontal plane when first emitted. A laser 110 could be capable of emitting more than one laser beam 112 each of which correspond to a different predetermined height, such as via one laser beam 112 being angled downwards relative to another laser beam 112 emitted from the same laser 110.

Lasers 110 may also be movable horizontally, vertically, and/or via changing an orientation of the laser 110. This may allow a system to be reconfigured to have the laser beam(s) 112 of a laser 110 correspond to new predetermined heights of the vessel 114 or allow a completely new vessel 114 with a different geometry to be used in the system 100, which could require a new positioning of the lasers 110. Lasers 110 could also be moved during the process of measuring the volume of liquid in a vessel 114 to find a precise value for that volume. For instance, if the readings of a sensor array 102 indicate that the predetermined height corresponding to the laser beam 112 is above the height of the liquid level via measuring a certain refraction of the laser beam 112, the laser 110 may be lowered until the readings of the sensor array 102 show a change in refraction of the laser beam 112 or a reduction in the amount of laser beam 112 received (in case the liquid contained in the vessel 114 at least partially absorbs the laser beam 112). The displacement of the laser 110 from its original predetermined height can be measured, such as by the processor 120, to find the precise height of the vessel at which the liquid level lies. The opposite scenario may also/alternatively be carried out, in which a laser 110 can be raised if the readings of the sensor array 102 indicate the predetermined height of the laser beam 112 is below the liquid level's height. Measuring the displacement of the predetermined height necessary for the path of the laser beam 112 to no longer be influenced by the liquid in the vessel 114 can be used to calculate the precise height of the liquid level.

Figure 2A:
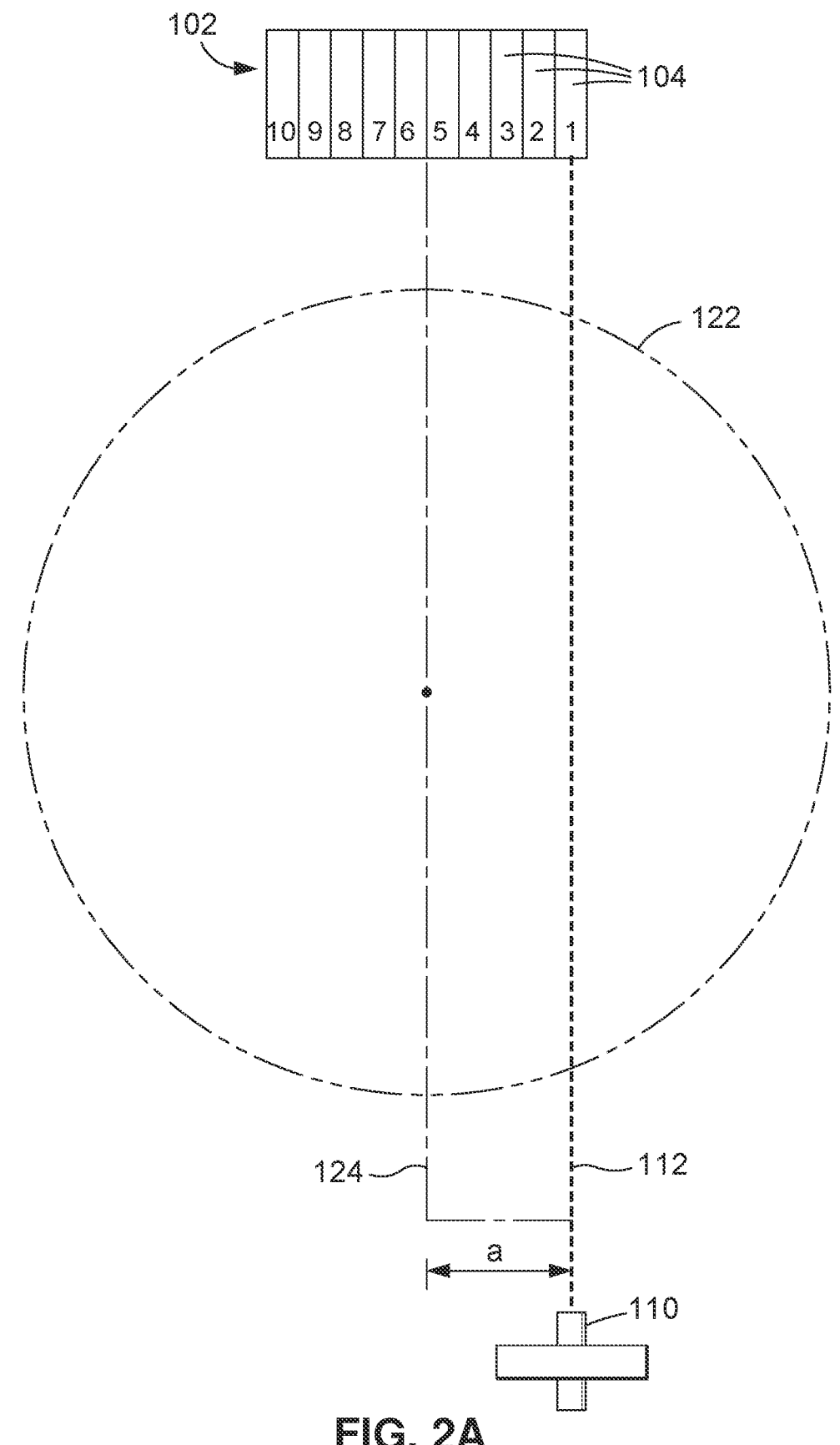
FIG. 2A is a top, cross-sectional view of an exemplary system at a predetermined height and the operation of that exemplary system without a vessel positioned.

Referring now to FIG. 2A, a top, cross-sectional view of an exemplary system at a predetermined height and the operation of that exemplary system without a vessel positioned is shown. A laser beam 112 may correspond to this predetermined height a laser 110 being positioned to emit a laser beam 112 which could intersect a vessel 114 at this predetermined height, were that vessel 114 properly positioned (this position may be designated by the dotted circle 122, denoting a cross section of the vessel 114 at the predetermined height). A sensor array 102 can comprise multiple sensors 104, which may be spaced from one another across horizontal (shown) and/or vertical (not shown) directions. Sensors 104 could be grouped as rows or columns of sensors. The laser apparatus 108 can be spaced across from the sensor array 102 such that laser beams 112 emitted from lasers 110 of the laser apparatus 108 could be received by the sensor array 102, while also leaving space for a vessel 114 to be properly positioned therebetween.

The geometry of a vessel 114, or at least a section thereof/a cross-section thereof, could define a centerline 124, such as a line of symmetry, or a bisecting line, but centerlines 124 may also be defined in other/arbitrary portions of a vessel 114. The measurement of a geometry of a vessel 114 may allow one to identify or choose a centerline 124. This centerline 124 may serve as a basis for the positioning of the vessel 114, laser apparatus 108, and/or sensor array 102, as the initial trajectory of the laser beam 112 when emitted from a laser 110 may have a particular relationship with this centerline 124 so as to produce particular refraction results. For example, the emitted laser beam 112 could be parallel to the centerline 124 and/or the emitted laser beam 112 could be offset from the centerline 124 by a distance "a". Offsetting the emitted laser beam 112 in this manner may allow for a sufficient degree of refraction to occur when the vessel 114 is present with/without liquid, as aligning the laser beam 112 closer or with the centerline 124 may result in little/no refraction (potentially making the same sensor 104 receive most of the laser beam 112 despite the presence of a vessel 114 with or without liquid at the predetermined height). Still, offsetting the laser beam 112 by too large of a distance "a" may cause the laser beam 112 to become too heavily diffracted by the wall of a vessel 114 and/or absorbed by the wall of the vessel 114, which could prevent the sensor array 102 from adequately receiving the laser beam 112. The distance "a" could be adjusted, via the laser 110 being movable in a horizontal direction, which may be beneficial when a new vessel having a different geometry is being used in a system 100. Through experimentation, one could determine an ideal offset distance "a" by finding what distance "a" results in different sensors 104 receiving the laser beam 112 for different refraction outcomes (no vessel present, vessel present but no liquid at the predetermined height, vessel present as well as liquid at the predetermined height). Offsetting the emitted laser beam 112 in this manner may not be necessary if a liquid contained in a vessel 114 can at least partially absorb a laser beam 112, as the change in intensity of the laser beam 112 received by the sensor array 102 can be measured as opposed to refraction. In such cases, the laser beam 112 may align with (and thus, not be offset from) the centerline 124.

An absence of a vessel 114 between the sensor array 102 and the laser apparatus 108 may allow a laser beam 112 emitted from a laser 110 to be substantially uninterrupted and experience minimal/no refraction, thus traveling in an approximately straight line. As such, a sensor 104 directly across from the laser 110, which could be designated as a first sensor, or sensor 1 in FIG. 2A, may receive the laser beam 112. A strong reading from sensor 1 could thus indicate that there is no vessel 114 positioned for liquid volume measurement.

Figure 2B:
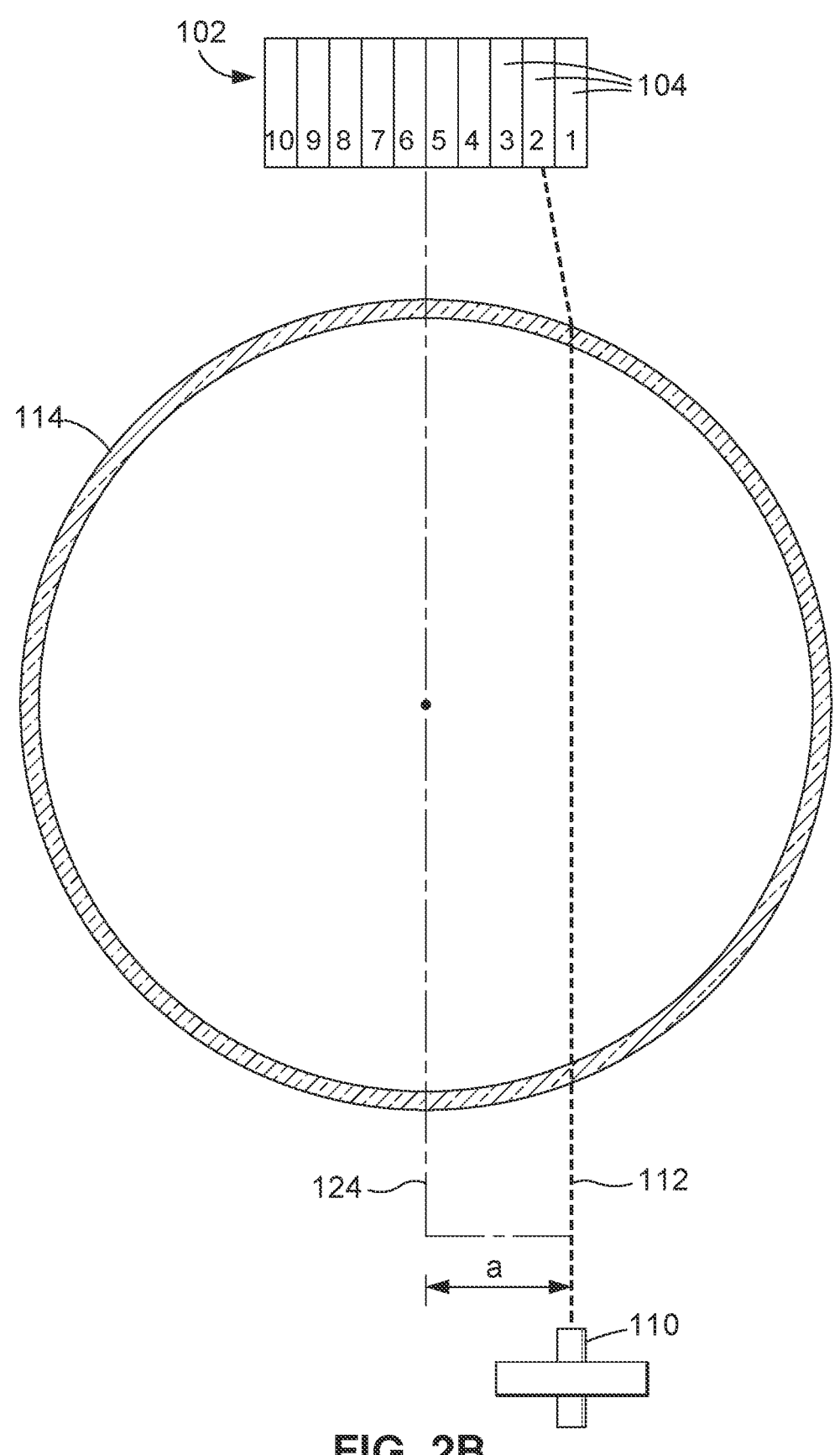
FIG. 2B is the top, cross-sectional view of the exemplary system of FIG. 2A and the operation thereof with an empty vessel positioned.

Referring now to FIG. 2B, the top, cross-sectional view of the exemplary system of FIG. 2A and the operation thereof with an empty vessel positioned is shown. In this scenario, a laser beam 112 emitted from a laser 110 corresponding to the predetermined height may first intersect the wall of a vessel 114 at the predetermined height thereof. When transmitting through the walls of the vessel 114, the laser beam 112 may refract and change its course compared to when the vessel 114 was absent (as was illustrated in FIG. 2A). This refraction may cause a second sensor, such as sensor 2 in FIG. 2B, to receive the laser beam 112. A strong reading from sensor 2 may thus indicate that a vessel 114 is positioned but that any liquid level in the vessel 114 falls below the predetermined height at which the laser beam 112 first intersects the vessel 114. For the purpose of finding the volume of liquid in the vessel 114, this outcome may lead to a conclusion that the volume of liquid is below the volume of liquid that would correspond to the predetermined height. A range of volume of liquid can then be determined, or the laser 110 can be moved to find a narrower range/a precise value for the volume of liquid, as described earlier.

Figure 2C:
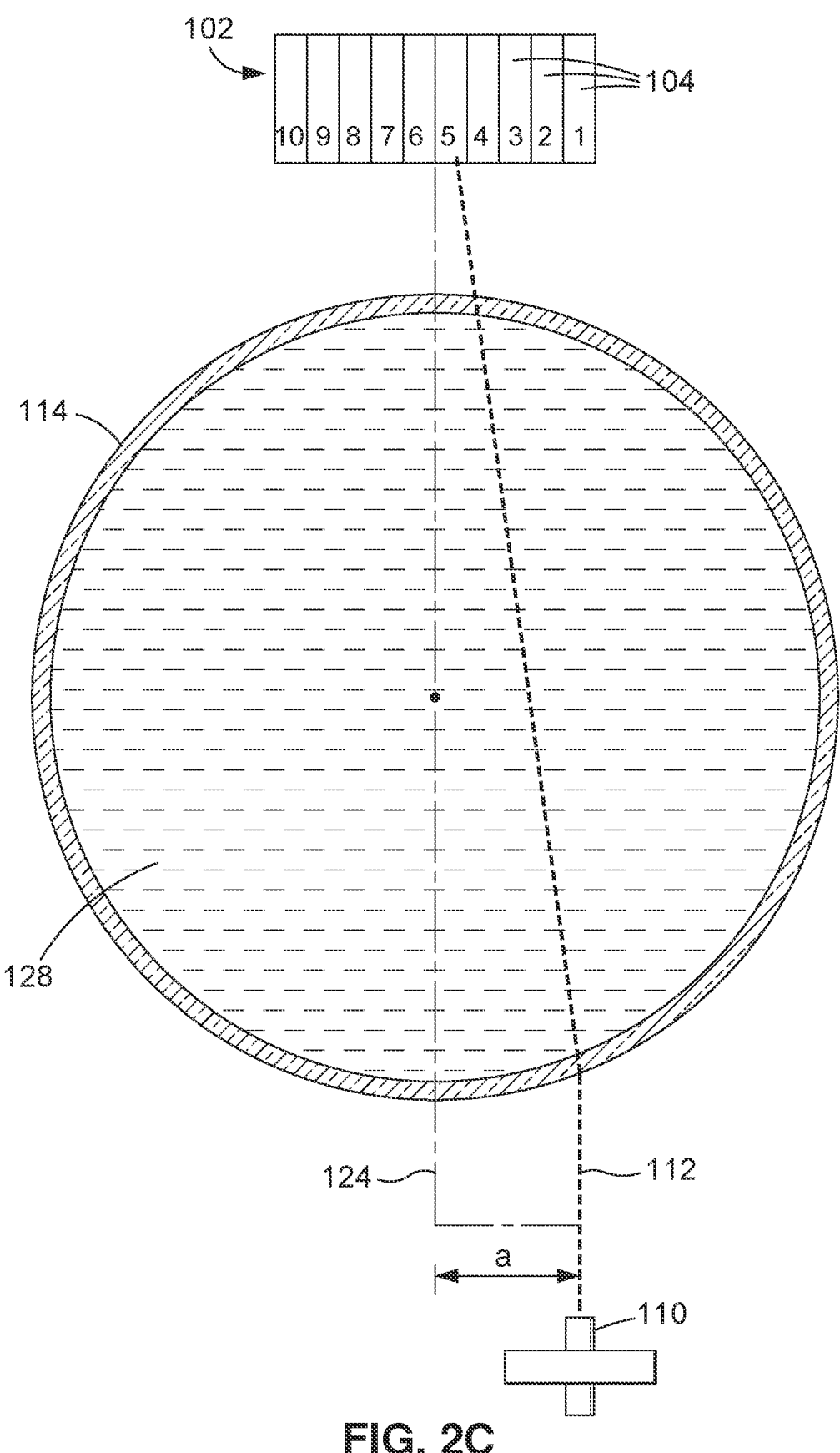
FIG. 2C is the top, cross-sectional view of the exemplary system of FIG. 2A and the operation thereof with a vessel positioned and liquid filled to the predetermined height.

Referring now to FIG. 2C, the top, cross-sectional view of the exemplary system of FIG. 2A and the operation thereof with a vessel positioned and liquid filled to the predetermined height is shown. Owing to the presence of liquid 128 at the predetermined height of the vessel 114, the laser beam 112 emitted from the laser 110 may experience another type of refraction when compared to the previous scenarios shown in FIGS. 2A and 2B. This type of refraction may cause a third sensor and potentially a fourth sensor to receive the laser beam 112, or sensor 4 and sensor 5 of FIG. 2C. A strong reading from sensor 4 and/or 5 could thus indicate the presence of liquid at the predetermined height. One could thus conclude that the volume of liquid in the vessel 114 is above the volume of liquid which correlates to the predetermined height corresponding to the laser beam 112. Once again, a range for the volume of liquid 128 can then be found or a narrower range/precise value for that volume can be found by moving the laser 110, as described earlier.

The scenario of FIG. 2C, in which the vessel 114 has liquid 128 at the predetermined height, may yield a different result depending on the light absorption properties of the liquid 128 and the type of laser beam 112 being emitted. If the liquid 128 is capable of absorbing the laser beam 112 (such as a wavelength of the laser beam), the amount of the laser beam 112 received by the sensor array 102 may be reduced or the sensor array 102 could potentially not receive any of the laser beam 112. One could be made aware of this by testing the capability of the liquid 128 to absorb the laser beam 112 beforehand and/or researching the properties of the liquid 128 and laser beam 112 being used. If so, the processor 120 may be programmed to recognize a reduction in readings on the sensors 104 (via comparing to the intensity of the sensor 104 readings when the laser beam 112 is not occluded) or an absence of readings on the sensors 104 as indicating the presence of liquid 128 at the predetermined height. As such, similar conclusions can be reached as to the volume of liquid 128 in the vessel 114, and moving the laser 110 can further advantageously assist in narrowing those conclusions.

Depending on a refraction of the laser beam 112, multiple sensors 104 could receive a laser beam, since the laser beam 112 could be split amongst different directions. The strength of the signal measured from sensors 104 receiving that laser beam 112, however, may differ, with the sensor 104 having the strongest reading usually being the strongest indicator of what type of refraction a laser beam 112 is experiencing. A processor 120 may take a weighted sum of the readings of the sensors and divide the sum by the number of sensors in a row to obtain a floating-point number ranging from 1-N, where N could represent the number of sensors 104 of a sensor array 102. As an example, with reference to the sensor array 102 shown in FIGS. 2A-2C, this calculated number could be 1.0 if sensor 1 receives most of the laser beam 112 (which could be outcome of the operation shown in FIG. 2A), close to 2.0 if sensor 2 receives most of the laser beam 112 (which could be outcome of the operation shown in FIG. 2B), and close to 4.5 if sensors 4 and 5 receive most of the laser beam 112 (which could be outcome of the operation shown in FIG. 2C). Working embodiments have shown that even if the signal is saturated on particular sensors 104, using a weighted average calculation have consistently found the sensor 104 which has received the laser beam 112 the strongest. A processor 120 may calculate an angle of refraction and/or a refraction distance of a laser beam 112 received by the sensor array 102 in addition to, or alternative to, the weighted sum calculation above.

As mentioned earlier, employing the systems and methods described above may be advantageous when used to measure the volume of a liquid for which an assay may be performed upon. It is envisaged that in such cases, the liquid could be a sample taken from individuals (in the case of a biopsy), or a non-biological fluid like water or wastewater. Finding and extracting target analytes like cell-free DNA (cfCNA), cell-free RNA (cfRNA), circulating tumor cells (CTCs), and/or viruses, bacteria, or other biohazards from such samples could be key in identifying early-stage cancers, health conditions, and more. Various methods and systems for sequestering target analytes from a liquid specimen are disclosed in Applicant's previously filed patent applications, including U.S. Pat. No. 10,329,554 entitled "System and Method for Sequestering Substances in Bulk Liquids" and U.S. Pat. No. 10,927,366 having the same title, the disclosures of which are incorporated herein by reference in their entirety. Some of these methods may require a precise amount of reagents (which can include buffers, conditioners, chemical agents, paramagnetic particles, preservatives, catalyst, and/or detection moieties) to be added to a sample; the specific amount of certain reagents to add to a sample in these processes may depend heavily on the volume of that sample. As such, the liquid volume detection systems and methods disclosed in this present application can be used as part of a process to sequester target analytes in a liquid specimen, including any of those disclosed in the aforementioned patents.

It is contemplated that in such applications, samples volumes ranging from 1 ml to 100 ml could be measured. In response to a measured volume of liquid contained in a vessel 114, the amounts of reagents to be added as part of an assay may be calculated, such as by a processor 120 of the system. In this respect, the processor could be programmed to recognize certain volumes of liquid as requiring certain amounts of reagents for the desired assay. A user could be informed of the amounts of reagents needed for one or more vessel 114, allowing the user to forecast the amounts of reagents needed, and/or costs for those reagents. When ready, a user can confirm the performance of the assay(s), after which the system 100 may automatically add the correct amounts of reagent(s) to the vessel 114. The processor 120 could also be programmed with more than one assay, allowing a user to select an assay and for the system 100 to consequently add the appropriate types and amounts of reagents to the vessel 114 pursuant to the measured volume of liquid therein.

The system 100 of this present disclosure may comprise features to fill the vessel 114 with these reagents (which could include one or more reservoirs for holding reagents), circulating the contents of the vessel 114, etc., and any of these features may be automated, allowing for a continuous, automated operations and procedures to be carried out in the system 100. A system 100 could find (via a determination by a processor 120, for instance) that there are insufficient reagents held in the reservoirs, or forecast when there will be insufficient reagents, for performing assays upon a liquid volume contained in a vessel 114, thus informing a user when to refill reservoirs with the proper reagents. A system 100 and its processor 120 may also keep track of how many times a system 100 has operated upon a vessel 114 via volume measurement and/or assay performance, how many times a certain vessel 114 has been used in a system 100, the cumulative volume of reagents consumed by the system 100, and more. Any of these statistics can inform a user when the system 100 requires maintenance, when a component or vessel 114 needs to be replaced, etc. The vessel 114 of this present disclosure may simultaneously be used as the specimen reservoir of the aforementioned patents (reference numeral "102" in those patents). The cuvette 116 of this present disclosure, also, may simultaneously be used as the vertex of the aforementioned patents (reference numeral "120" in those patents), wherein target analytes could be sequestered.

Depending on the geometry of the vessel 114, the refraction resulting from a laser beam 112 intersecting a portion of a vessel 114 may be too erratic/extreme to measure. As an example, the bottom of the vessel 114 depicted in FIG. 1 may be frustoconical, and a refraction of a laser beam 112 intersecting this portion of the vessel 114 may be challenging to measure small volumes of liquid. In some embodiments, this small volume could be less than 5 ml. If the liquid contained in the vessel 114 is to have reagents added to it, such as the situations described above, the vessel 114 may be partially filled with a reagent, such as a buffer, until a laser beam 112 set to a predetermined height outside of this frustoconical region is refracted by the liquid (which could be the height which correlates with 5 ml in certain embodiments). The original volume of liquid in the vessel 114 can be measured by subtracting the volume of reagent added to the vessel 114 in this process. Thereafter, the remaining reagents can be added to the vessel 114 as part of a biopsy procedure.

The above description is given by way of example, and not limitation. Given the above disclosure, one skilled in the art could devise variations that are within the scope and spirit of this disclosure. Further, the various features of the embodiments disclosed herein can be used alone, or in varying combinations with each other and are not intended to be limited to the specific combination described herein. Thus, the scope of the claims is not to be limited by the illustrated embodiments. Additional modifications and improvements of the present disclosure may also be apparent to those of ordinary skill in the art. Thus, the particular combination of parts and steps described and illustrated herein is intended to represent only certain embodiments of the present subject matter and is not intended to serve as limitations of alternative devices and methods within the spirit and scope of this disclosure.

What is claimed is:

1. A method of measuring the volume of liquid contained in a vessel, the method comprising the steps of:
providing a system comprising a sensor array and a laser apparatus, the sensor array comprising a plurality of sensors, the laser apparatus comprising a laser operative to emit a laser beam, the laser apparatus and the sensor array being positioned relative to each other such that an absence of the vessel therebetween allows a first sensor of the plurality of sensors to receive the laser beam when emitted from the laser;
positioning the vessel relative to the sensor array and the laser apparatus, said positioning setting a location and an orientation of the vessel, the orientation and the volume of liquid contained in the vessel defining a height of a liquid level;
emitting the laser beam from the laser; and
wherein the laser beam corresponds to a predetermined height of the vessel such that said positioning of the vessel causes the laser beam to intersect the vessel at the predetermined height,
wherein when the height of the liquid level is below the predetermined height, said step of positioning the vessel causes a second sensor of the plurality of sensors to receive the laser beam when emitted from the laser; and
wherein when the height of the liquid level is above the predetermined height, said step of positioning the vessel causes a third sensor of the plurality of sensors to receive the laser beam when emitted from the laser; and
wherein the method further comprises a step of:
at least partially filling the vessel with an amount of a reagent, the reagent being selected from the group consisting of: a buffer, a conditioner, a chemical agent, a paramagnetic particle, a preservative, a catalyst, a detection moiety, or combinations thereof;
wherein the amount of the reagent is based on a measured volume of liquid in the vessel determined from said step of emitting the laser beam from the laser.

2. The method of claim 1, wherein the system further comprises a light pipe, the light pipe being positioned relative to the laser apparatus and the sensor array such that the laser beam transmits through the light pipe prior to being received by the sensor array.

3. The method of claim 1, wherein the laser is movable relative to the location of the vessel from said step of positioning the vessel; and
wherein in response to the second sensor of the plurality of sensors receiving the laser beam, the method further comprises a step of:
raising the laser.

4. The method of claim 1, wherein the laser is movable relative to the location of the vessel from said step of positioning the vessel; and
wherein in response to the third sensor of the plurality of sensors receiving the laser beam, the method further comprises a step of:
lowering the laser.

5. The method of claim 1, wherein the method further comprises a step of:
sequestering a target analyte believed to be present in the liquid contained in the vessel.

6. The method of claim 1, wherein in response to the second sensor of the plurality of sensors receiving the laser beam, the method further comprises a step of:
partially filling the vessel with a reagent, said filling causing the volume of liquid in the vessel to reach the predetermined height.

7. The method of claim 1, wherein after said positioning of the vessel and prior to the laser beam intersecting the vessel, the laser beam is parallel to and off-center relative to a center line defined by the vessel.

8. A system for measuring the volume of liquid contained in a vessel, the system comprising:
a sensor array comprising a plurality of sensors;
a laser apparatus comprising a laser operative to emit a laser beam, the laser apparatus and the sensor array being positioned relative to each other such that an absence of a vessel therebetween allows a first sensor of the plurality of sensors receives the laser beam when emitted from the laser;

wherein the system is operative to receive the vessel, the system further comprising a clamp for said receiving of the vessel, said receiving setting a location and orientation of the vessel, the orientation and the volume of liquid contained in the vessel defining a height of a liquid level;

wherein the laser beam corresponds to a predetermined height of the vessel such that said receiving of the vessel causes the laser beam to intersect the vessel at the predetermined height when emitted from the laser;

wherein when the height of the liquid level is below the predetermined height, said receiving of the vessel causes a second sensor of the plurality of sensors to receive the laser beam when emitted from the laser; and wherein when the height of the liquid level is above the predetermined height, said receiving of the vessel causes a third sensor of the plurality of sensors to receive the laser beam when emitted from the laser.

9. The system of claim 8, wherein the laser apparatus further comprises a second laser operative to emit a second laser beam, the laser apparatus and the sensor array being positioned relative to each other such that a fourth sensor of the plurality of sensors receives the second laser beam when emitted from the second laser;

wherein the second laser beam corresponds to a second predetermined height of the vessel such that said receiving of the vessel causes the second laser beam to intersect the vessel at the second predetermined height when emitted from the second laser;

wherein when the height of the liquid level is below the second predetermined height, said receiving of the vessel causes a fifth sensor of the plurality of sensors to receive the second laser beam when emitted from the second laser; and wherein when the height of the liquid level is above the second predetermined height, said receiving of the vessel causes a sixth sensor of the plurality of sensors to receive the second laser beam when emitted from the second laser.

10. The system of claim 8, wherein the system further comprises a light pipe, the light pipe being positioned relative to the laser apparatus and the sensor array such that the laser beam transmits through the light pipe prior to being received by the sensor array.

11. The system of claim 8, wherein the laser is operative to be movable relative to the location of the vessel from said receiving of the vessel; and wherein in response to the second sensor of the plurality of sensors receiving the laser beam, the system is operative to raise the laser.

12. The system of claim 8, wherein the laser is operative to be movable relative to the location of the vessel from said receiving of the vessel; and wherein in response to the third sensor of the plurality of sensors receiving the laser beam, the system is operative to lower the laser.

13. The system of claim 8, wherein the system is further operative to at least partially fill the vessel with an amount of a reagent, the reagent being selected from the group consisting of: a buffer, a conditioner, a chemical agent, a paramagnetic particle, a preservative, a catalyst, a detection moiety, or combinations thereof; and wherein the amount of reagent is based on a measured volume of liquid determined from an emission of the laser beam from the laser.

14. The system of claim 8, wherein the system is further operative to sequester a target analyte believed to be present in the liquid contained in the vessel.

15. The system of claim 8, wherein in response to the second sensor of the plurality of sensors receiving the laser beam, the system is further operative to partially fill the vessel with a reagent, said filling causing the volume of liquid in the vessel to reach the predetermined height.

16. The system of claim 8, wherein when the system receives the vessel and prior to the laser beam intersecting the vessel, the laser beam is parallel to and off-center relative to a center line defined by the vessel.

17. A method of measuring the volume of liquid contained in a vessel, the method comprising the steps of:

providing a system comprising a sensor array and a laser apparatus, the sensor array comprising a plurality of sensors, the laser apparatus comprising a laser operative to emit a laser beam, the laser apparatus and the sensor array being positioned relative to each other such that an absence of the vessel therebetween allows a first sensor of the plurality of sensors to receive the laser beam when emitted from the laser, the laser apparatus further comprising a second laser operative to emit a second laser beam, the laser apparatus and the sensor array being positioned relative to each other such that the absence of the vessel therebetween allows a fourth sensor of the plurality of sensors to receive the second laser beam when emitted from the second laser;

positioning the vessel relative to the sensor array and the laser apparatus, said positioning setting a location and an orientation of the vessel, the orientation and the volume of liquid contained in the vessel defining a height of a liquid level;

emitting the laser beam from the laser;

emitting the second laser beam from the second laser; and wherein the laser beam corresponds to a predetermined height of the vessel such that said positioning of the vessel causes the laser beam to intersect the vessel at the predetermined height, wherein when the height of the liquid level is below the predetermined height, said step of positioning the vessel causes a second sensor of the plurality of sensors to receive the laser beam when emitted from the laser;

wherein when the height of the liquid level is above the predetermined height, said step of positioning the vessel causes a third sensor of the plurality of sensors to receive the laser beam when emitted from the laser wherein the second laser beam corresponds to a second predetermined height of the vessel such that said positioning of the vessel causes the second laser beam to intersect the vessel at the second predetermined height;

wherein when the height of the liquid level is below the second predetermined height, said step of positioning the vessel causes a fifth sensor of the plurality of sensors to receive the second laser beam when emitted from the second laser; and wherein when the height of the liquid level is above the second predetermined height, said step of positioning the vessel causes a sixth sensor of the plurality of sensors to receive the second laser beam when emitted from the second laser.

* * * * *